Aug. 3, 1954    L. P. MOREY ET AL    2,685,323
MACHINE FOR APPLYING BITE-WINGS
TO DENTAL X-RAY FILM PACKAGES
Filed Dec. 29, 1951    9 Sheets-Sheet 1

LEON P. MOREY
ERNEST J. BUTLER
INVENTOR.

BY

ATTORNEYS

LEON P. MOREY
ERNEST J. BUTLER
INVENTOR.

BY

ATTORNEYS

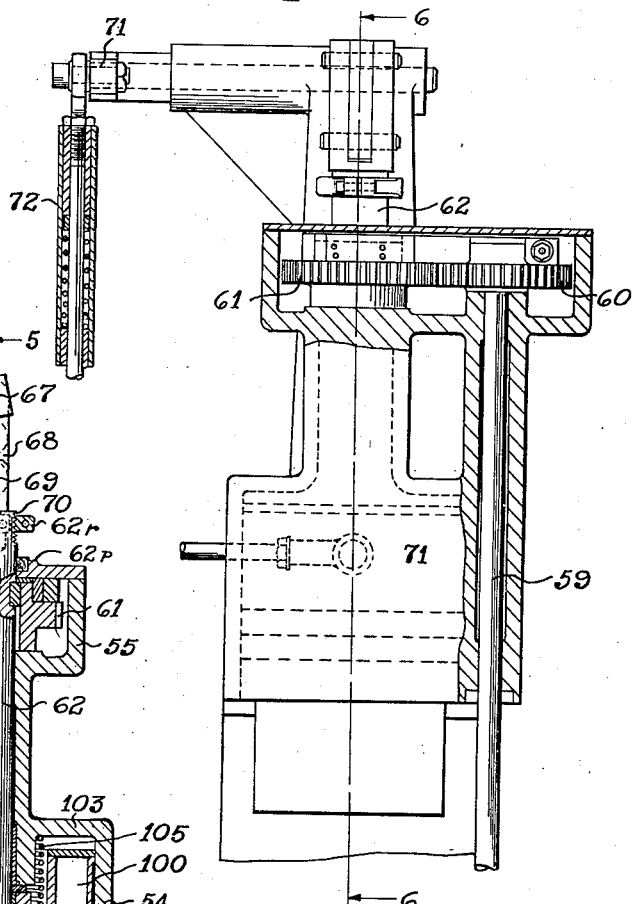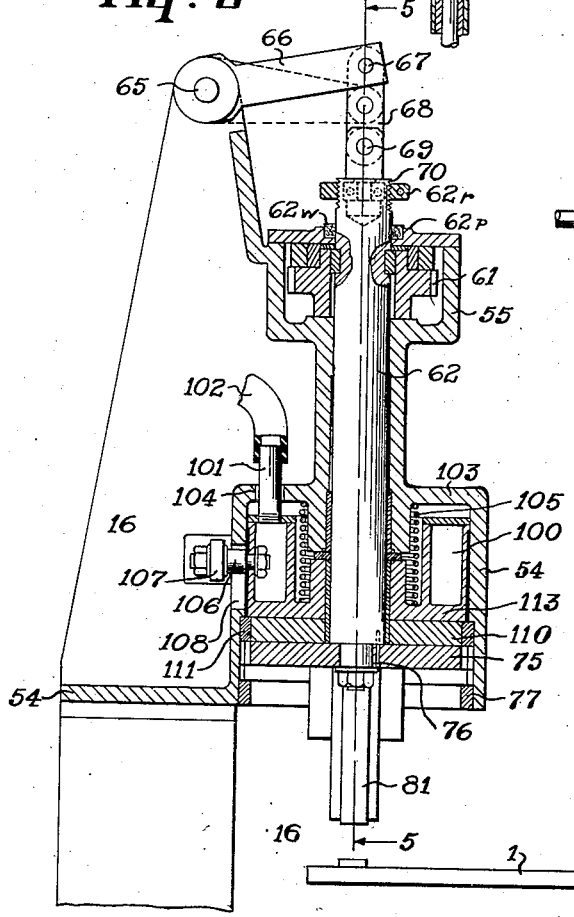

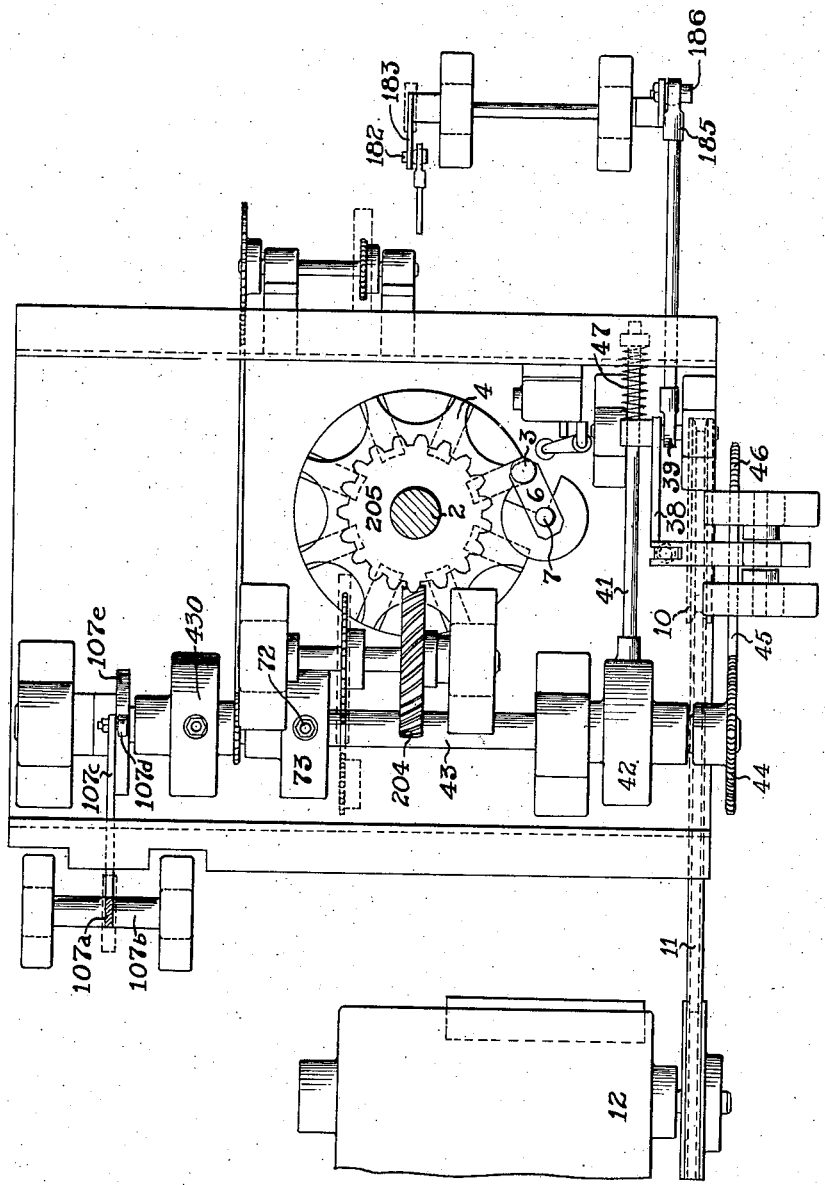

Aug. 3, 1954
L. P. MOREY ET AL
MACHINE FOR APPLYING BITE-WINGS
TO DENTAL X-RAY FILM PACKAGES
2,685,323
Filed Dec. 29, 1951
9 Sheets-Sheet 5
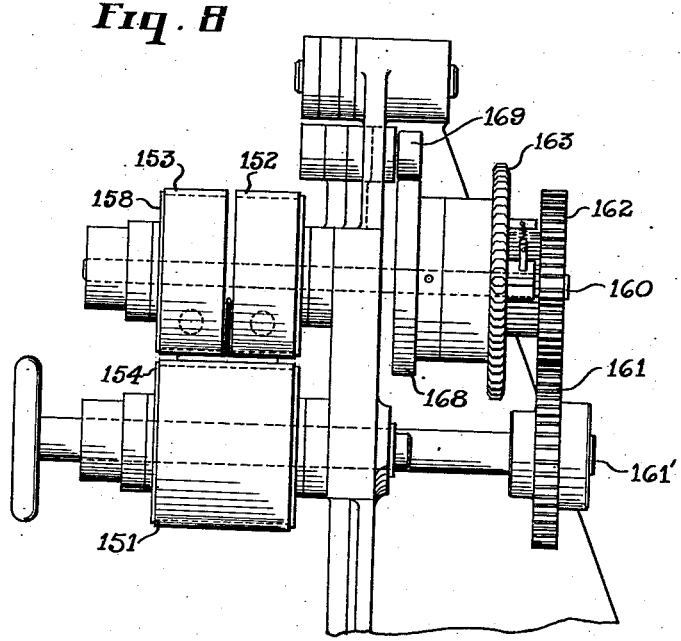
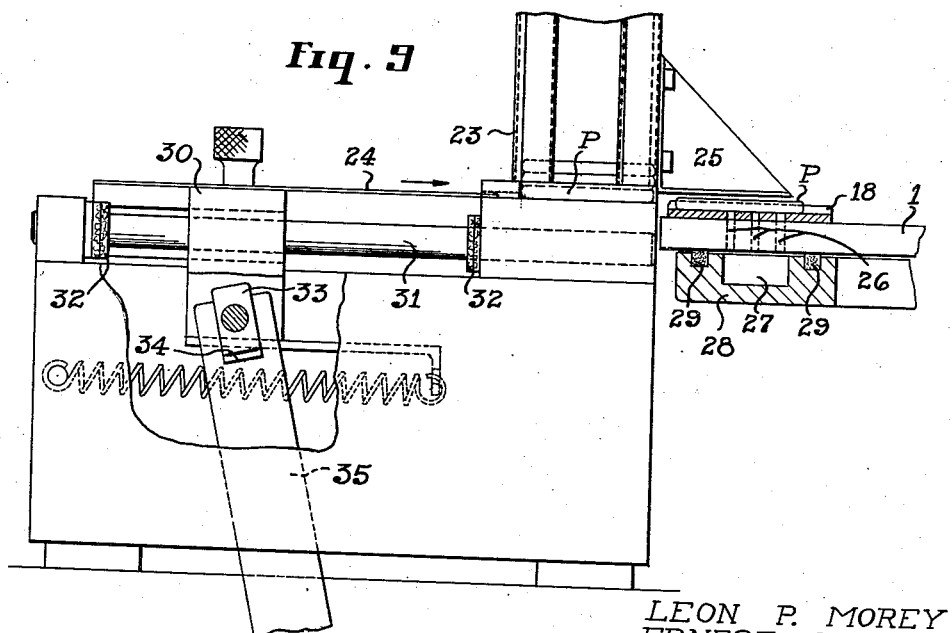
LEON P. MOREY
ERNEST J. BUTLER
INVENTOR.
BY
ATTORNEYS Aug. 3, 1954

L. P. MOREY ET AL 2,685,323

MACHINE FOR APPLYING BITE-WINGS TO DENTAL X-RAY FILM PACKAGES

Filed Dec. 29, 1951

LEON P. MOREY
ERNEST J. BUTLER
INVENTOR.

BY

ATTORNEYS

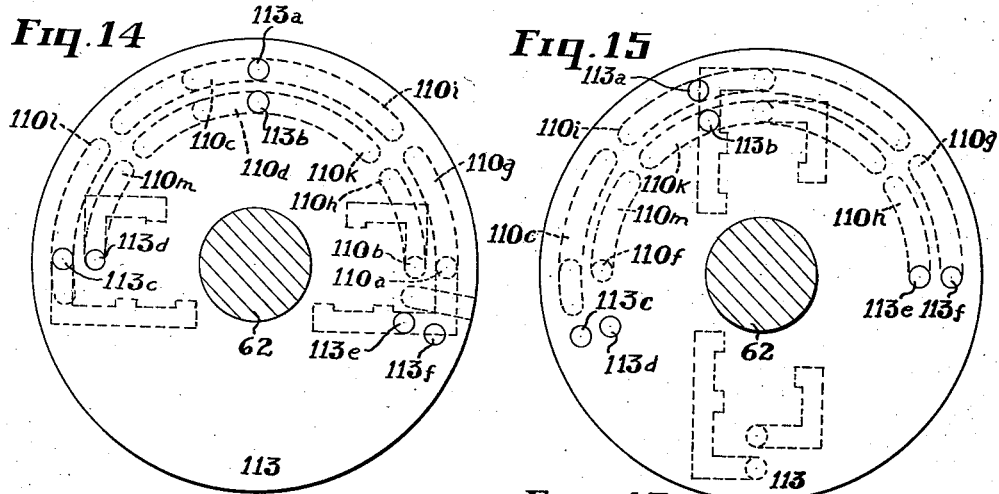
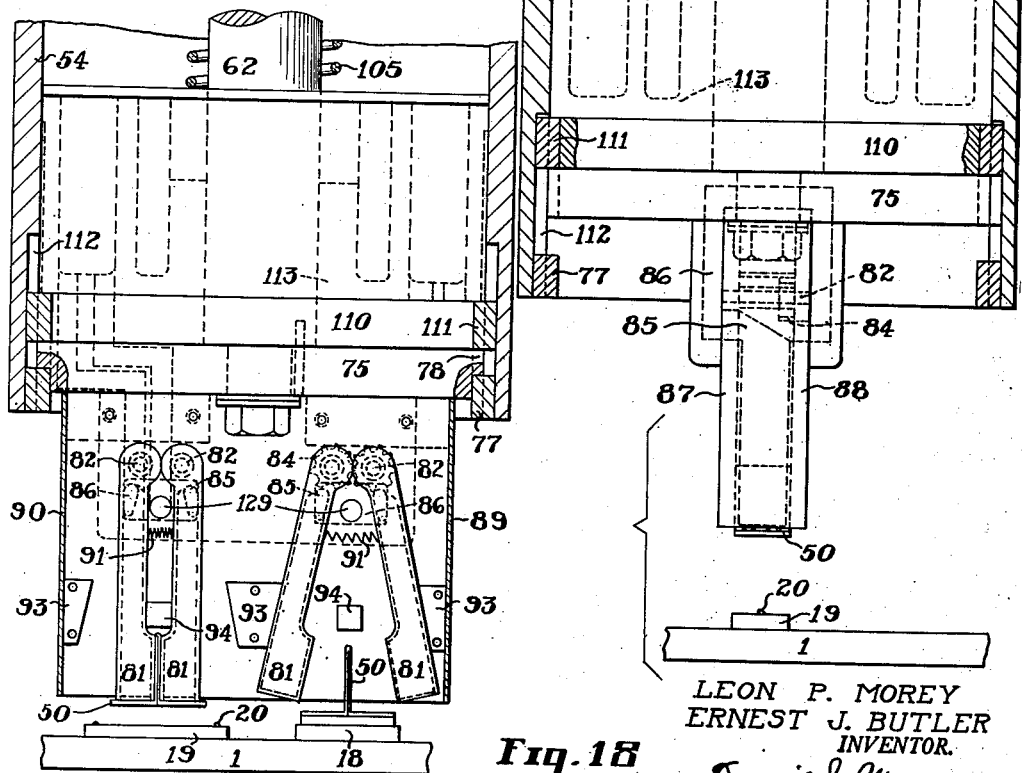

Aug. 3, 1954 L. P. MOREY ET AL 2,685,323
MACHINE FOR APPLYING BITE-WINGS
TO DENTAL X-RAY FILM PACKAGES
Filed Dec. 29, 1951 9 Sheets-Sheet 8
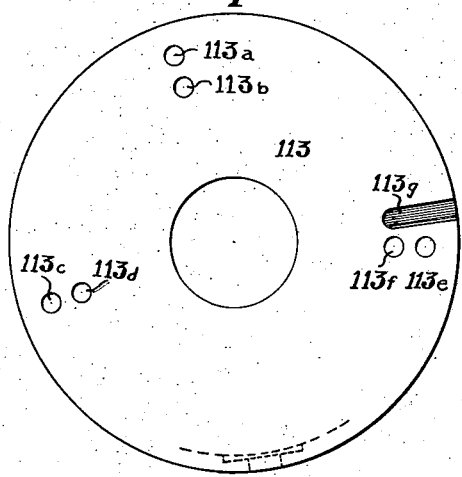
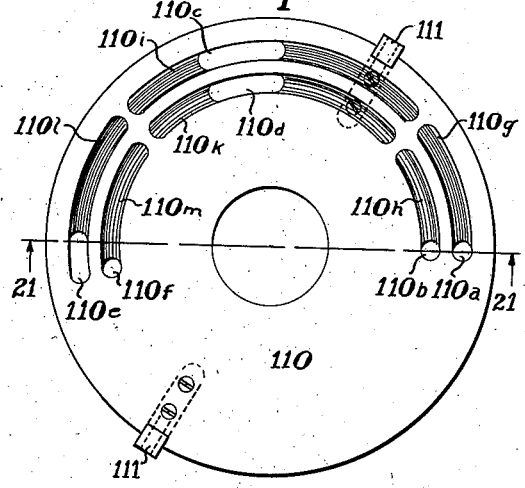
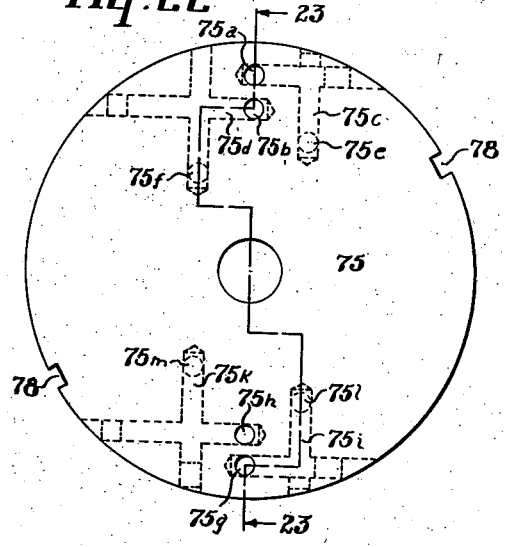
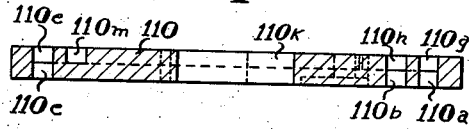
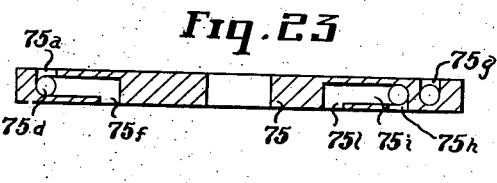
LEON P. MOREY
ERNEST J. BUTLER
INVENTOR.
BY
ATTORNEYS Aug. 3, 1954
L. P. MOREY ET AL
2,685,323
MACHINE FOR APPLYING BITE-WINGS
TO DENTAL X-RAY FILM PACKAGES
Filed Dec. 29, 1951
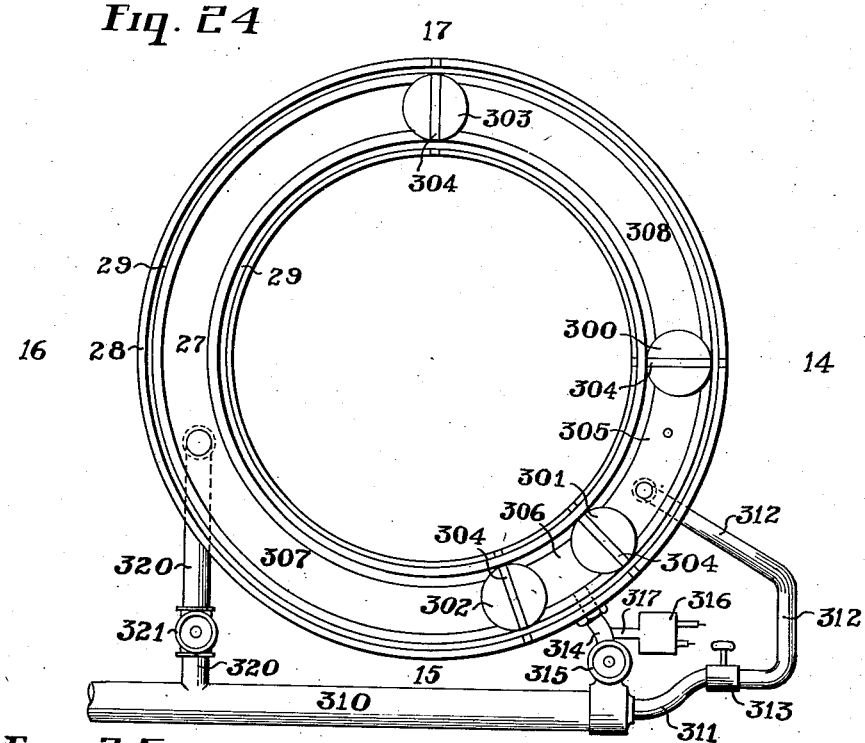
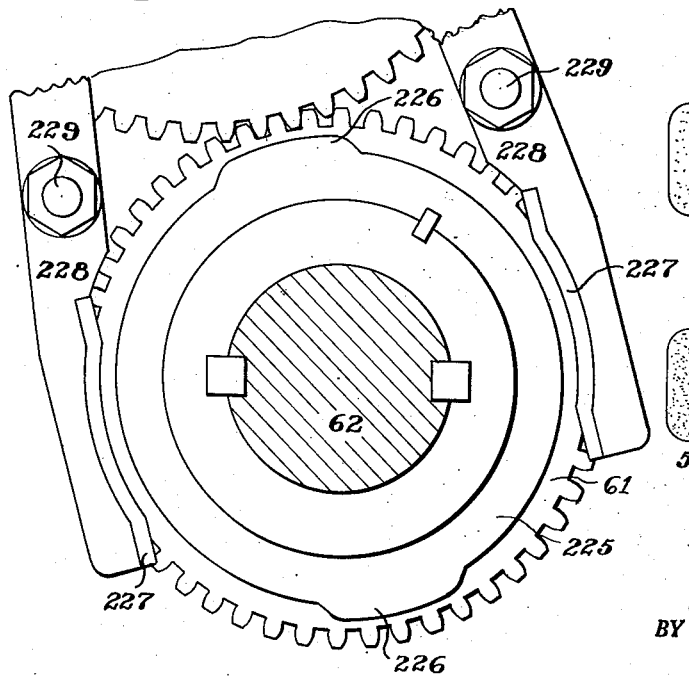
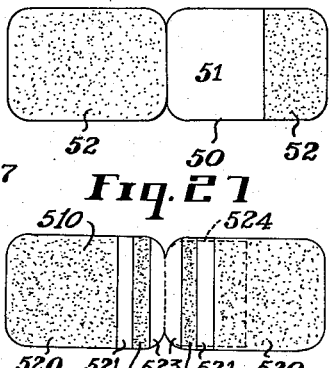
LEON P. MOREY
ERNEST J. BUTLER
INVENTOR.
BY Daniel I. Mayne
Donald H. Stewart.
ATTORNEYS Patented Aug. 3, 1954

2,685,323

UNITED STATES PATENT OFFICE 2,685,323

MACHINE FOR APPLYING BITE-WINGS TO DENTAL X-RAY FILM PACKAGES

Leon P. Morey and Ernest J. Butler, Rochester, N. Y., assignors to Eastman Kodak Company, Rochester, N. Y., a corporation of New Jersey Application December 29, 1951, Serial No. 264,082

15 Claims. (Cl. 154—1.6)

This invention relates to machines for applying bite-wings to dental X-ray film packages. These bite-wings permit a package containing dental X-ray film to be held in proper position in a patient's mouth by the teeth of the patient biting down on the bite-wing. One object of our invention is to provide a machine which can apply bite-wings to dental X-ray packages at high speed. Another object of our invention is to provide a machine of the class described in which the bite-wing is firmly attached to the X-ray film package by an adhesive. Another object of our invention is to provide an automatic machine in which there is a means for conveying bite-wing blanks and dental X-ray film packages to a station where the bite-wing may be folded and applied to the dental X-ray film package after which the package will be removed and passed through pressure members to insure the proper adherence of the bite-wing to the package through pressure and, if desired, also by means of pressure members with the application of heat. Other objects will appear from the following specification, the novel features being particularly pointed out in the claims at the end thereof.

Bite-wing packages of dental X-ray film are well-known in the dental X-ray art. In most instances, these packages consist of a flexible strap which is attached to a dental X-ray film package so that a portion of the strap projects away from the package and may be held at substantial right angles to an X-ray film contained in the package so that the latter may be properly positioned behind the teeth of the patient when the bite-wing is held between the teeth. So far as applicants are aware, automatic machines for applying bite-wings have not been known since it has been customary to apply such bite-wings by hand, often by slipping a loop on the base of the bite-wing around the package, and sometimes by otherwise attaching the bite-wing to the package. Because of the hand work, dental X-ray film packages have been comparatively expensive, and one of the objects of our present invention is to provide a machine in which the bite-wings may be applied to the dental X-ray film packages at relatively high speed, such as 60 per minute.

We have shown in the drawings a preferred form of a machine which is well-suited to carry out the objects of this invention. In the drawings in which like reference characters denote like parts throughout:

Fig. 5 is a fragmentary view which is part side elevation and part section, on line 5—5 of Fig. 6, through the mechanism for turning the bite-wing applying table and showing a portion of the means for moving the table up and down;

Fig. 6 is a fragmentary sectional view taken on line 6—6 of Fig. 5, certain parts being shown in elevation;

Fig. 7 is a fragmentary top plan view, with the circular conveyor removed and parts shown, partially in section, illustrating the driving mechanism;

Fig. 8 is a fragmentary end elevation illustrating a portion of the bite-wing pressing mechanism through which the dental X-ray film packages and bite-wings pass before leaving the machine;

Fig. 9 is a fragmentary side elevation, partially in section, of a feeding device for forwarding dental X-ray film packages to their seats in the conveyor;

Fig. 14 is a view similar to Fig. 10 but with the ports in the position they assume when the picker members have released an applied bite-wing and have folded a bite-wing blank as shown in Fig. 16;

Fig. 15 is a view similar to Fig. 14, but with the ports shown in position they assume when the picker members are at the center part of their 180° rotation as shown in Fig. 17;

Fig. 16 shows the position of the picker members when the spindle is not rotating and when the picker members are in the position they assume after applying a bite-wing to a dental X-ray film package and after a bite-wing blank has been folded;

Fig. 17 is a view similar to Fig. 16 but with the picker fingers turned midway between their 180° movement relative to the conveyor;

Fig. 18 is a fragmentary section showing the means for locating relatively movable valve parts in certain positions;

Fig. 19 is a bottom plan view of the top valve plate;

Fig. 20 is a top plan view of the middle valve plate;

Fig. 21 is a section taken on line 21—21 of Fig. 20;

Fig. 22 is a top plan view of the lower valve plate;

Fig. 23 is a section taken on line 23—23 of Fig. 22;

Fig. 24 shows a fragmentary top plan view of vacuum or reduced pressure means for retaining a dental X-ray film packet on the conveyor;

Fig. 25 is a fragmentary part top elevation and part section showing friction brake for turn table shaft;

Fig. 26 shows an unfolded bite-wing as applied to the conveyor seats and before being folded by the applicator; and Fig. 27 is a top plan view of a modified form of paster.

Our invention consists broadly in providing a conveyor with pairs of adjacent seats, each pair containing one seat for a dental X-ray film package and a second seat for a bite-wing blank. These seats are loaded automatically with a dental X-ray film package at one station and with a bite-wing blank at a second station. However, since these automatic feeding devices form no part of the present invention, they are not described in detail.

After the seats have been loaded, the pairs of seats are intermittently advanced by means of the conveyor to a bite-wing applying station. At this station a bite-wing blank is picked up, folded, turned 180°, and lowered into contact with, and pressed upon, a dental X-ray film package in the adjacent seat. Thus each time one bite-wing is applied to an X-ray film package, a second bite-wing blank is picked up, to be folded and applied to another X-ray film pack. From the applying position, the conveyor moves the dental X-ray film package to a pressing or creasing station into which it is moved from the dental X-ray film seat between creasing members which may, if desired, apply both heat and pressure to the feet of the bite-wing to insure proper adhesion between the bite-wing and the dental X-ray film package.

In the present embodiment of our invention, the conveyor is shown as being a rotatable conveyor which is intermittently advanced by a Geneva drive to successively bring the pair of seats beneath the bite-wing applying station. The cycle of operations moves a pair of seats to the applying station and the conveyor is halted and held stationary while a carriage, carrying two pairs of picker members, moves downwardly. In operation, one pair of picker members carries a folded bite-wing downwardly and presses it against a dental X-ray film package while a second set of picker members picks up an unfolded bite-wing blank so that as this blank moves away from the conveyor it is folded into a bite-wing and into shape for application to a dental film package. After the carriage moves away from the conveyor, it is rotated 180° for folding the bite-wing blank and positioning it for application while the conveyor is moving. When the conveyor comes to rest, the folded bite-wing is applied to the dental X-ray film package while the second set of picker members again picks up an unfolded blank. This, of course, occurs after the conveyor has again come to a halt. Air is preferably used to control the folding and applying movements of the picker arms. These arms are hollow and have perforated ends for engaging and moving the bite-wings and blanks therefor. The invention will now be described in more detail.

Figure 1:
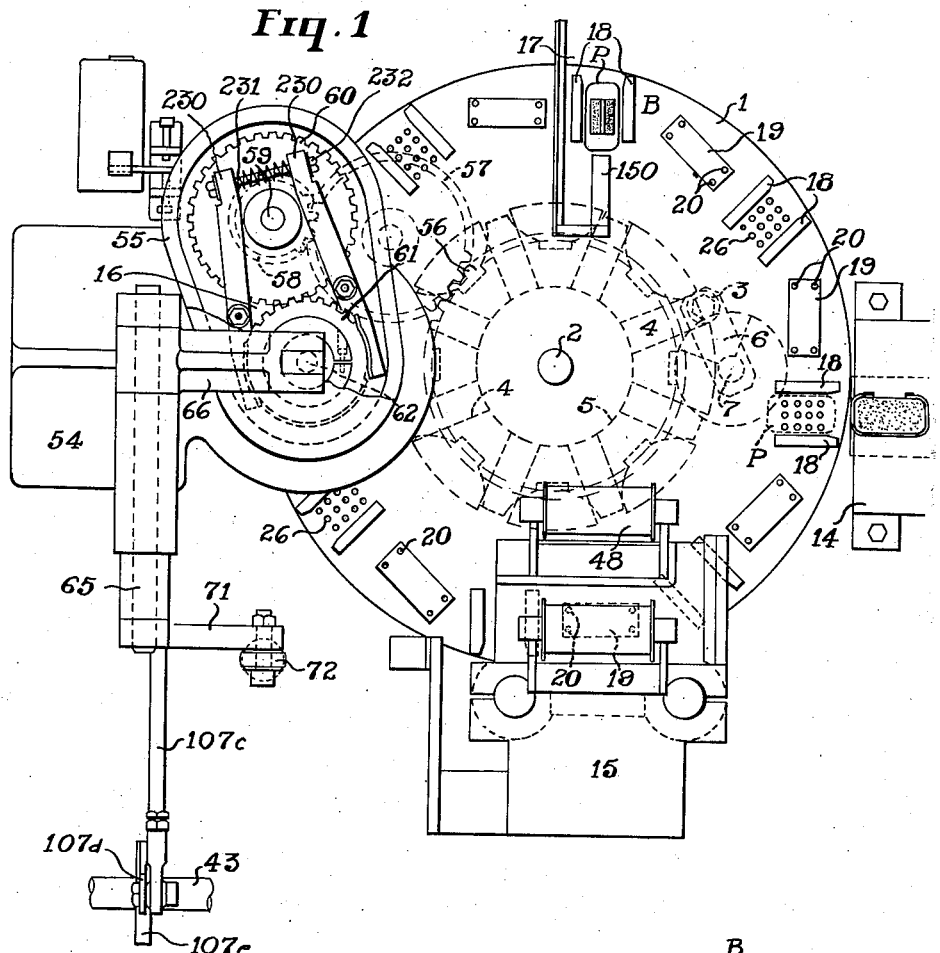
Fig. 1 is a top plan view of some of the more essential parts of a bite-wing assembling machine illustrating the relationship of the carrier, the seats for the dental X-ray film package and bite-wing blanks and the relationship of the bite-wing applying carriage to the conveyor. Many of the unessential parts of the machine has been omitted to better illustrate the invention.
Figure 2:
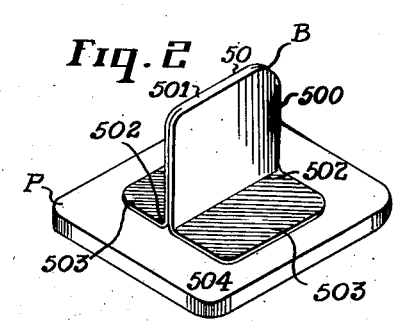
Fig. 2 is a perspective view of a typical dental X-ray film package which may be assembled with a bite-wing on the machine shown in the drawings. The dental X-ray film package is shown on an enlarged scale.
Figure 4:
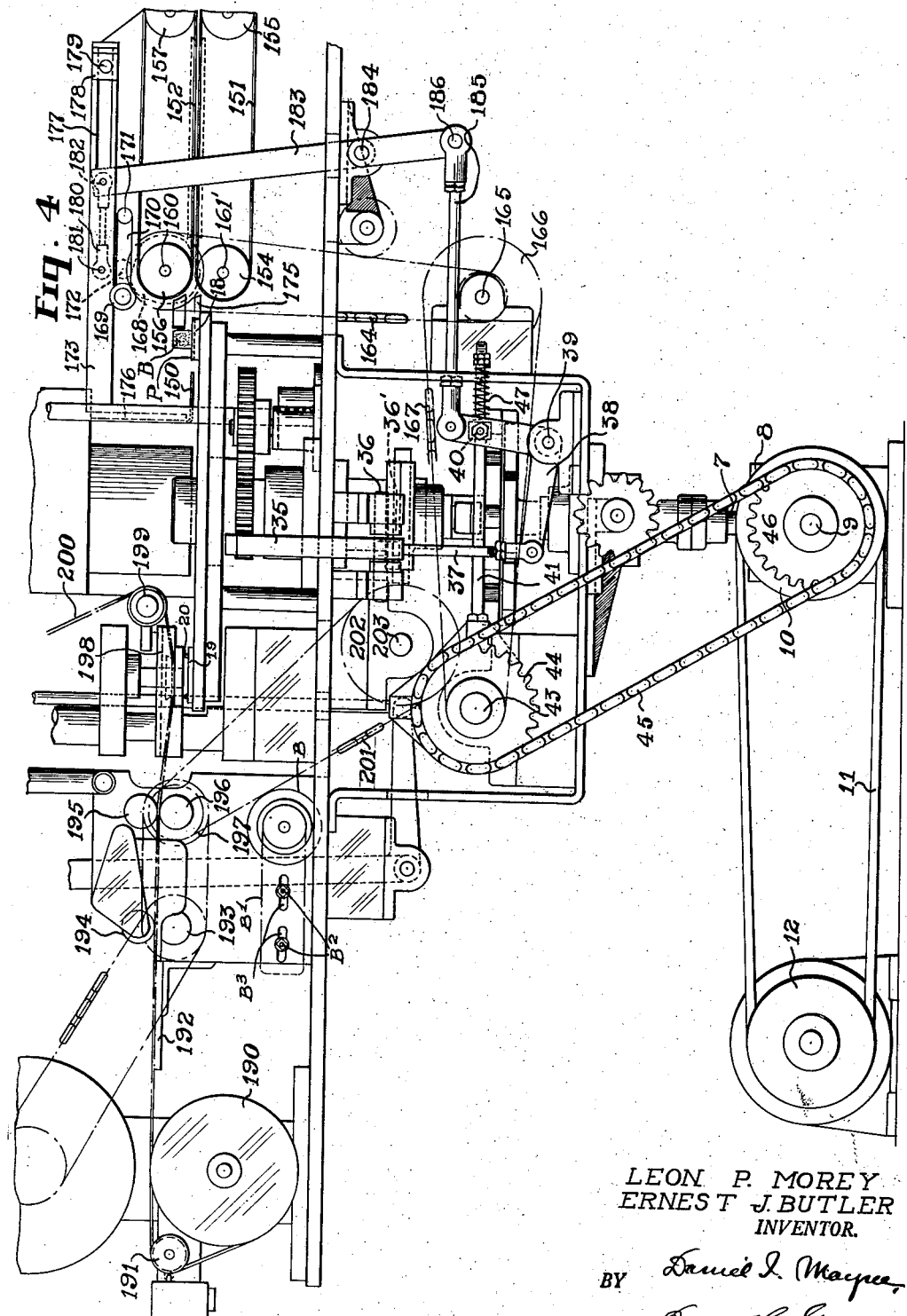
Fig. 4 is a side elevation of the bite-wing assembling machine shown in Fig. 1 showing the connection of the various movable parts to the power drive. Here, again, many of the unessential features of the machine are omitted.

Referring to Fig. 1, an embodiment of our machine may consist of a conveyor 1, here shown as a circular conveyor, mounted on a shaft 2 to turn intermittently through a Geneva driver 3, which successively engages slots 4 in a Geneva gear 5. The Geneva driver 3 is carried by an arm 6, driven by a shaft 7. This shaft, as shown in Fig. 4, is driven through miter gears in a gear box 8. One miter gear is attached to a shaft 9 rotated by a pulley 10 and belt 11 from a motor 12. The table 1 may be driven, one step at a time, past a dental X-ray package loading station 14, Fig. 1, a bite-wing blank loading station 15 and a bite-wing applying station 16, after which the dental X-ray package P with the applied bite-wing B is moved to a pressing station 17 where the bite-wing is pressed and, if necessary, heated and pressed to insure proper adherence against the film package.

The table 1 carries equally-spaced pairs of seats. One seat consists of a pair of package-locating rails 18 for receiving the film package P. The other seat consists of a platform 19, having pins 20 for engaging an unfolded bite-wing blank 50 shown in Fig. 26. These seats are equally spaced from the center of a shaft 62 which carries the bite-wing applying mechanism, at each position of rest of the table 1.

When a package P is to be loaded on the table 1, the structure shown in Figs. 1 and 9 is employed. A stack of bite-wing packages P is placed in the box-like structure 23 so that a plunger 24 may slide in the direction shown by the arrow to move the bottom package P beneath the guide 25 and into a position between the rails 18. The package P may be held in this position by a reduced pressure or vacuum in the orifices 26, this vacuum being derived from a groove 27 extending approximately three-quarters of the way around a ring 28, Fig. 24, which is sealed at 29, Fig. 9, against the table 1 and which ring is fixedly mounted on the machine frame. The shape of this ring is better shown in Fig. 24 which shows that the vacuum groove 27 extends from the film package loading station 14 to just short of the bite-wing pressing station at 17. During the movement of the table 1 to move a package between these positions, the reduced pressure through the vents 26 holds the dental X-ray film package in the position shown in Fig. 9.

It is obvious that when a pack P is loaded at the loading station 14 the air pressure through apertures 26 must not be great enough to retard proper positioning. Accordingly, the reduced pressure chamber 27 is divided into sections, which can be inexpensively accomplished with plugs 300, 301, 302 and 303. Each plug has a transverse sealing strip 304 of leather, rubber, felt or any suitable air retarding or air obstructing material. Thus, groove 27 is divided into sections by these plugs.

One section 305 lies between plugs 300 and 301. A second detecting chamber 306 lies between plugs 301 and 302. A third holding chamber 307 lies between plugs 302 and 303. A fourth atmospheric chamber 308 lies between plugs 303 and 300. There is a reduced pressure line 310 which may be a vacuum equal to 14" of mercury or any suitable pressure. To this line 310, a line 311 and 312 leads to chamber 305. Valve 313 permits adjustment of pressure in chamber 305 to just that pressure which permits sliding the package P into place between rails 18 where it may be held by suction through apertures 26.

Lines 314 and valve 315 control the pressure in detecting chamber 306. If no packet P is in its seat 18, air leaking through apertures 26 operates a vacuum switch 316 through pipe 317, thus stopping the machine. On the other hand, if a package P is present and in its seat, the machine continues to run. The vacuum switch may be connected into the line of the main driving motor 12.

The third holding chamber 307 lies between plugs 302 and 303 and is connected to the reduced pressure line 310 through pipes 320 and valve 321. This carries a relatively substantial amount of vacuum to definitely hold packet P in seat 18 during the application of the bite-wing by the turntable 16, and while the package P and bite-wing B moves on to the delivery station 17 where plug 303 is positioned to release the suction by the time the package is removed by the pusher member 150, Fig. 1.

The slide 24 is oscillated through a shoe 30, movable on rails 31, and stops 32 may be arranged to limit both extends of movement of the slide. A hinged element 33 engages a groove 34 in an arm 35 which is one arm of a bell-crank lever pivoted at 36 to the machine. The other arm 36', Fig. 4, which is moved by a link 37 attached to a bell-crank lever 38, has pivotally mounted, on its upper arm, a slide block 40. This slide block 40 is normally held against a shoulder on rod 41 by a spring 47 backed up by two adjusting nuts. Rod 41 is the push rod from cam 42 mounted on shaft 43 which is driven through a sprocket 44, chain 45 and a sprocket 46 carried by the power drive shaft 9. The purpose of the spring operating link formed by rod 41, slide 40, spring 47 and the back-up nuts is to prevent breakage of the entire mechanism when a jam occurs at the feed or at the delivery (pressing and heating) station. Since both stations are operated through spring 47, if a jam occurs at either or both stations the eccentric merely compresses the spring at each stroke and the balance of the linkage remains stationary until the obstruction causing the jam is removed. Thus, the film packages P are advanced to the conveyor 1 in timed relation with the movement of the conveyor.

As the conveyor 1 moves step-by-step, a seat 19 is brought directly beneath the bite-wing blank applying station 15. Since the structure of this station is unimportant for the present invention, it may be pointed out that a blanked-out bitewing, as shown in Fig. 26, is blanked from a roll of material 190 and the blanked-out piece is pressed downwardly upon the pins 20 so that the bite-wing blank will be held in a flat position, Fig. 4. Fig. 27 shows a modified form of bitewing 510 with strips of gummed areas 520, and bands 521 and 523 which are ungummed, as well as bands 525 which are gummed. This reduction in the gummed areas facilitates punching out the bite wings without undue gumming of the punch and die. 524 is a heavy paper reinforcing forming a part of the bite-wing.

Thus, as the conveyor 1 continues to move intermittently, the center between one pair of seats 18 and 19 is brought directly beneath the axis of mechanism at the bite-wing applying station 16 so that at this station one bite-wing blank may be picked up while another bite-wing may be adhesively secured to a dental X-ray film package P. It will be noticed from Fig. 26 that the bite-wing blank consists of a paper strip 50 on which there is attached a reinforcing piece 51, and an adhesive area 52. This adhesive area lies downwardly with respect to the conveyor 1 and seat 19. It may be of a "surgeon's tape" or other suitable type.

The bite-wing applying station, Figs. 1, 5 and 6, designated broadly as 16 includes a support, in the form of a casting 54 on which there is a housing 55 which is immovably mounted. The conveyor 1, Fig. 1, includes a gear 56, meshing with a gear 57, this gear turning a pinion 58, shaft 59 and gear 60. This latter gear in turn meshes with a gear 61 so that this gear and a shaft 62 are turned, in the present instance, through 180° each time the table 1 is moved one step by the Geneva gear.

As indicated in Figs. 5 and 6, the shaft 62 may be moved up and down, as well as turned. Because of the movement of gear 61, it may be turned. The up-and-down movement is obtained by a rocker arm 65, Fig. 1, to which is attached a lever 66. This lever carries a pivotal support 67 for a link 68, Fig. 6, which link in turn is pivotally attached at 69 to the shaft 62 through a ball bearing mount 70. Thus, the shaft 62 may turn in the ball bearing mount without turning the link 68.

The shaft 65 may be rocked by means of a lever 71 connected to a cam follower rod 72 which extends downwardly into contact with a cam 73 shown on Fig. 7. This cam is carried by a shaft 43 driven by the sprocket 44. Fig. 4 indicates that the sprocket 44 is driven through chain 45 and sprocket 46 on shaft 9 from the power drive 12. Consequently, the cam 73 will operate in timed relation with the rest of the machine.

As indicated in Figs. 1, 5 and 6, the shaft 62 is intermittently rotated in timed relation to the movement of the support or carrier 1 so that it will turn a disk 75 which in effect forms a turntable since the disk 75 is pinned at 76 to the shaft 62. This turntable rotates 180° at a time. To accurately locate the turntable, there is, Fig. 18, a pin 77 carried by casting 54 and groove 78 carried in turntable 75 and having rounded edges 79 so that, as the disk 75 moves on the casting 54, it is accurately guided into place. This insures proper registration of the bite-wing on the X-ray film package as will be more fully described hereinafter.

Figure 12:
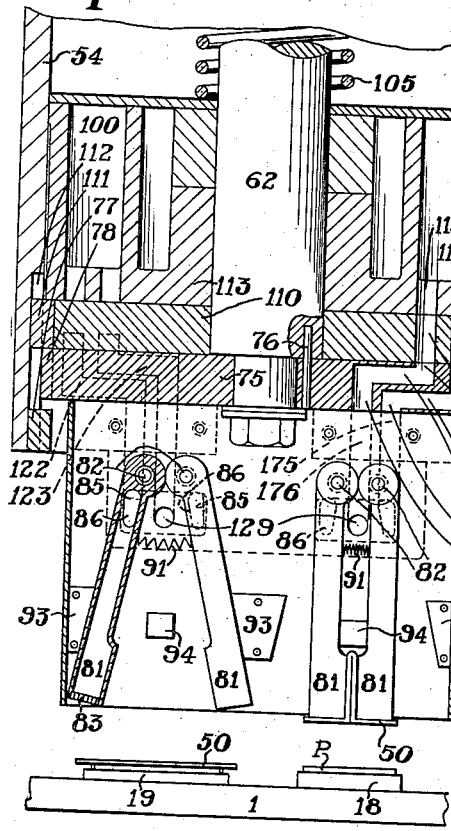
Fig. 12 is an enlarged fragmentary sectional view through the picker members and control valve with the spindle at rest and with the picker members in position to apply a bite-wing to a dental X-ray film package.
Figure 13:
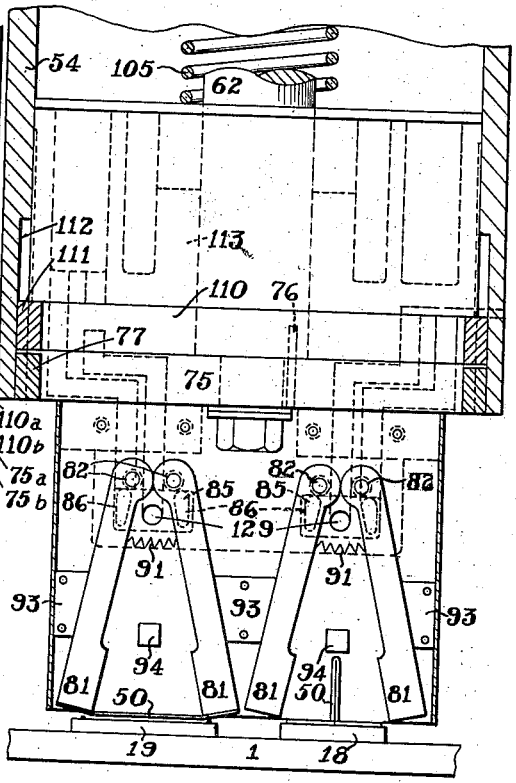
Fig. 13 is a view similar to Fig. 12 with parts shown in elevation and parts shown in section, showing the picker members after a bite-wing has just been applied to a dental X-ray film package and just as a second set of picker members are moving a bite-wing blank from a conveyor seat. Here the picker members have started to raise from the conveyor.

The turntable 75, as shown in Figs. 12 and 13, forms a support for two pairs of picker arms or members 81. These pairs are alike in that each comprises right- and left-hand hollow elongated box-like members. Each member is pivotally attached to a shaft 82 at one end and each member has perforations at 83 on its opposite end. Gear segments 84 shown only in Fig. 16 on each member mesh and cause each pair of arms to turn to the same degree simultaneously. Ports 85 in each picker arm may lie over a port 86 in an enclosure plate 87 so air may pass therethrough. Each shaft 82 may be carried by the side enclosure plates 87 and 88, Fig. 17, with which end enclosure plates 89 and 90 closely confine the picker members and make a reasonably air-tight connection therewith except at the bottom of the enclosure which is open. A spring 91 tends to always separate the pairs of picker arms 81. Fig. 13 shows them in a normal open or rest position. This position is varied to pick up a bite-wing, fold the bite-wing, and press the bite-wing against a dental X-ray package, these movements occurring from a rest position of the turntable 75, a movement upwardly while turning 180° thereof and a movement downwardly at the end of which the bite-wing is deposited on the dental X-ray film package.

Figure 3:
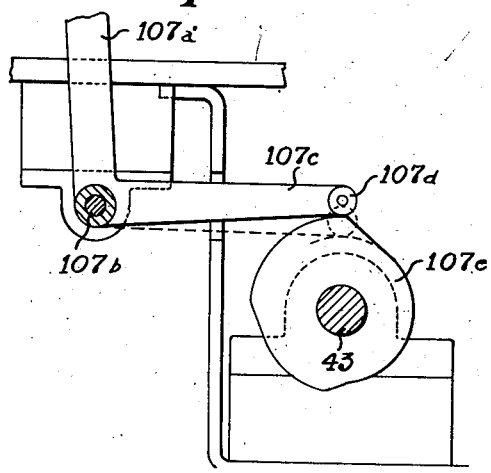
Fig. 3 is a fragmentary detail view showing the operating cam and follower lever which oscillates the rotary vacuum valve in the bite-wing applying carriage to enable the mechanism to pick up and fold the bite-wing.

We preferably have pneumatic control for all these movements as will now be described. Casting 71 slidably encloses a reduced pressure chamber member 100 connected to a reduced pressure line, Fig. 6, through pipe 101 and the flexible tube 102. The upper wall 103 of casting 71 is arcuately slotted at 104 to permit arcuate and axial movement of the reduced pressure chamber 100. A spring 105 tends to hold the chamber 100 downwardly and this chamber may be moved through an arcuate path by the shaft 106, and rod 107 passing through slot 108 in casting 71. This slot is long enough for axial movement of chamber 100 relative to casting 71 and is wide enough for 25° to 30° movement about the axis of shaft 62. This movement may be such as to move member 113 to three circumferential positions. These may be selected as 10° apart although any suitable angle may be used. This movement is also independent of axial movement of shaft 62. Rod 107 is connected to one end 107ª of a bell crank lever pivoted at 107ᵇ, Figs. 3 and 7, to the frame, the other end 107ᶜ carrying a roller 107ᵈ running on cam 107ᵉ. This cam is carried by the shaft 43 which is power driven. Thus, as cam 107ᵉ turns, the steps thereon shift the angular position of the upper valve plate 113. Air chamber 100 also forms one part of an air control valve, since the bottom wall thereof 113 constitutes a top valve plate. This air control valve in addition includes a middle valve plate 110 which may move axially but may not turn because of keys 111 slidable in grooves 112. The third, or bottom, valve plate may include turntable 75 which may turn arcuately and move axially and may be located radially by the flanges 77 and grooves 78, the latter being shown in Fig. 19.

Vents in the above valve plates constitute air controls which control the picker arms 81 and 82 to cause them to pick up a bite-wing, fold the bite-wing and deposit the folded bite-wing on the package. Figs. 10 to 17 show the several positions of the valve parts and ports, and Figs. 19 to 23 the valve ports.

Referring to Figs. 19 to 23 for the air ports, it will be noted that the upper valve plate 113 (the bottom of the reduced pressure chamber) is provided with three pairs of apertures extending straight through the wall, namely 113ª and 113ᵇ, 113ᶜ and 113ᵈ, and 113ᵉ and 113ᶠ. There is also a venting groove 113ᵍ which extends radially to the outside diameter of the plate 113.

The middle valve plate is shown in Figs. 20 and 21. Here, plate 110 has a pair of apertures 110ª and 110ᵇ extending through the plate, and a pair of slots 110ᶜ and 110ᵈ extending through the plate. There is also a pair of apertures, one 110ᵉ which is arcuate, and one 110ᶠ which is round, extending through the plate. Grooves 110ᵍ and 110ʰ extend arcuately from apertures 110ª and 110ᵇ to one side of these apertures. Similar grooves 110ⁱ and 110ᵏ extend in both directions from the slots 110ᶜ and 110ᵈ. Similar grooves 110ˡ and 110ᵐ extend arcuately in one direction from round aperture 110ᵉ and arcuate aperture 110ᶠ.

The third and lower valve plate 75, as shown in Figs. 22 and 23, has a still different arrangement of passageways. On the top of the plate 75 there is a pair of apertures entering the plate, 75ª and 75ᵇ, and these are connected by passageways 75ᶜ and 75ᵈ to apertures 75ᵉ and 75ᶠ in the bottom of the plate. In a similar manner, apertures 75ᵍ and 75ʰ are connected by passageways 75ⁱ and 75ᵏ to apertures 75ˡ and 75ᵐ in the bottom. The offset passageways 75ᶜ, 75ᵈ and 75ⁱ, 75ᵏ are to bring the apertures 75ᵉ and 75ᶠ, and 75ˡ and 75ᵐ into a position so that they may provide air controls for the picker arms and air controls for the space between the picker arms, both of which are necessary to pick up and fold a bite-wing blank.

The three valve plates 113, 110 and 75 in different positions control the air to the picker arms to control movement thereof.

Figure 10:
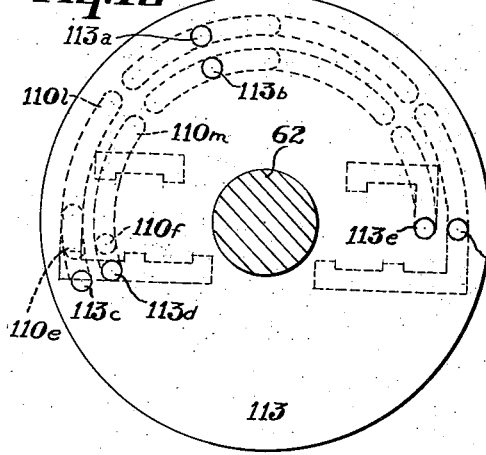
Fig. 10 is a schematic plan view of portions only of the main control valve with the ports arranged in the position they assume when the bite-wing picker members are in the position shown in Fig. 12.

In the Figs. 10 and 12 position, the turntable 75 is moving downward. The left-hand set of picker arms 81 are opened by spring 91 and in position to pick up a bite-wing blank 50. The right-hand set of picker arms 81 are closed holding a folded bite-wing between them to apply to a dental X-ray package. The open position is determined by stops 93 whereas the closed position is defined by the stops 94.

The control valves 113, 110, and 75 in Figs. 10 and 12 provide reduced pressure to the right-hand picker arms 81 through apertures 113ᵉ, 113ᶠ in 113; 110ª, 110ᵇ in 110; 75ª, 75ᵇ in 75; passageways 75ᶜ, 75ᵈ in 75; and apertures 75ᵉ and 75ᶠ in 75. Apertures 75ᵉ, 75ᶠ now lie adjacent passageways 175 and 176, the former leading to registering apertures 85 and 86 and the latter leading to aperture 129 between picker arms 81. Thus, the apertured ends 83 of the picker arms hold the ends of the bite-wing blank which have been folded between the arms by reduced pressure through 129 between the arms 81 and their side plates 87 and 88, Fig. 17. At the same time, valve plates 113, 110 and 75 have cut off air pressure to the left-hand picker arms which lie open under the influence of spring 91.

Figure 11:
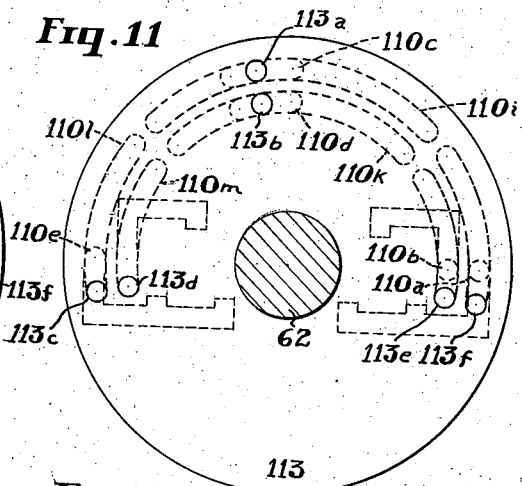
Fig. 11 is a view similar to Fig. 10 but with the ports in position they assume when the picker members are in their Fig. 13 position.

Figs. 11 and 13 show the spindle 62 which has come to rest at the bottom of its vertical travel, the folded tab has been applied and the turntable very slightly raised to release right-hand picker arms from the package. As turntable 75 reaches the bottom, the top valve 113 is quickly turned to cut off air lines to the right-hand picker arms 81 and opens air lines to left-hand picker arms. The ends of the bite-wing blank are sucked against the perforated ends 83 of the picker arms while open as shaft 62 starts up. Pressure on right-hand picker arms has been released and spring 91 has just opened right-hand picker arms.

Figs. 14 and 16 illustrate the position of upper valve plate 113 which has again moved circumferentially to open air duct to left-hand picker arm and, as bite-wing blank bends upwardly between picker arms 81, it brings arms quickly together, thus accurately folding the tab in the exact center. Port 129 causes this suction between picker arms. Gears or gear segments 84, of course, cause picker arms to move together and stops 94 insure that both arms stop accurately in position relative to center line of shaft 62.

When the shaft 62 has raised a sufficient distance (as ⅞″) to clear the applied bite-wing, it starts to turn and, by the time it reaches the top of stroke (about 1¼″), it has rotated one-half of its total movement, or 90°, as shown in Figs. 15 and 17. Here, the valve plates 113, 110 and 75 are so aligned that the air holes of 113 and the center valve plate 110 are out of range of the valve slots in the bottom plate 75 and are in mating position with reduced pressure holding slots. The purpose of these slots 110e, 110h, 110i, 110k etc. is to maintain reduced pressure in the picker arms 81 which are holding the newly-folded bite-wing. The upper valve plate is then turned in a reverse direction and back to the Figs. 10 and 12 position which cuts off the air from the left-hand side of the center valve disk 110 and opens the right-hand side. This supplies reduced pressure in the valve grooves in disk 110 so that, while the turning movement of the lower valve disk 75 continues, as it leaves the holding grooves it can move to the end of the 180° rotation without losing the reduced pressure in the picker arms 81, thus holding the folded bite-wing instead of dropping it. Following position shown in Figs. 15, 17, rotation continues until applicator or turntable has rotated 180° and at the same time descended to a position above—say ⅞″—the bottom of the stroke. Figs. 10 and 12 show this position in which the cycle is completed.

After the bite-wing has been applied by a picker arm, the package is complete, but to insure that the adhesion between the bite-wing and the X-ray film package is the best that can be obtained, we prefer to have an added pressing and sealing operation at the pressing station 17 where added pressure and some heat, if desired, may be applied to the bite-wing and package. Because film is sensitive to both heat and pressure, great care must be taken to stay within the proper limit for both of these operations.

Referring to Fig. 1 and to the pressing station 17 thereof, it will be noticed that an X-ray package P with attached bite-wing B is shown as positioned between a pair of rails 18. A pusher 150 is provided to engage and move the package P at each time the table 1 stops onto a belt 151 which carries the package away from the conveyor and so that the upwardly-extending bite-wing B may pass between a pair of slightly spaced belts 152, 153 so that these belts with belt 151 can lightly squeeze the attached bite-wing tabs more firmly (if they are imperfectly attached) into adhesive contact with the package P. As shown in Figs. 4, 8 and 9, belt 151 is supported by rollers 154 and 155. Belt 152 is supported by rollers 156 and 157. Belt 153 is carried by rollers 158—159 and a roller of each set 154, 156 and 158 is driven, 154 through shaft 159 and 156 and 158 through shaft 160. Shafts 161' and 160 are driven together by gears 161 and 162, Fig. 8. Shaft 160 is driven by sprocket 163, chain 164, shaft 165, pulley 166 and chain 167 from power shaft 43 so that the belts all move continuously.

A cam 168, turning with shaft 160, engages a roller 169 on arm 170 pivoted at 171. This cam, through roller 172 raises and lowers arm 173 carrying the pusher arm 150 so that it will intermittently move up and over the bite-wing B on an approaching package P, and after going over the bite-wing will move down engaging the package P and push it out onto the belt 151 with the bite-wing B extending between belts 152 and 153. A flanged guide plate 175 may direct the package to the belts if desired.

Arm 173 and its downward extension 176 carrying pusher arm 150 is slotted at 177 to receive a shoe 178 pivoted to the frame at 179 so arm 173 may both pivot and slide. The sliding movement is intermittent and in timed relation to the Geneva movement of table 1. A link 180 is pivoted at 181 to arm 173 and at 182 is pivoted to lever 183 pivoted at 184 to the frame. A second link 185 pivoted at 186 to lever 183 is also pivotally attached to bell crank 38 pivoted in turn at 39 to the frame. This lever moves in timed relation to the Geneva.

The bite-wings are made from roll material 190, Fig. 4, drawn from a roll over guide roller 191, guide 192 between a conveyor and between rollers 193, 194 and 195, 196. Thence, the material is led past a punch and die 198 over guide roll 199 and the remaining part of the tape (after the bite-wing is punched out) is led away at 200 to scrap. The details of this bite-wing masking and applying mechanism are not a part of this invention. The bite-wings are blanked out downwardly and directly onto a bite-wing seat 19 and its pins 20. The drive for roll 190 is accomplished in timed relation to the Geneva through a pulley 197, chain 201 and pulley 202 carried by shaft 203. The chain 201, Fig. 4, may be engaged by the chain tightening roller B carried by the slide B¹ and adjustable by bolts B² passing through the slots B³. Shaft 203 is turned by bevel gears 204, 205, the latter being affixed to the conveyor table shaft 2. The operation of punch 198 is in timed relation to the Geneva by means of an eccentric 430 mounted on shaft 43 which, through a suitable linkage, operates the punch to blank out the bite-wing and set it on pins 70.

Care must be taken to control the movement of the turntable at the applicator station to reduce the effect of lost motion between gears to precisely locate the picker arms relative to the bite-wing blank seat 19 and the X-ray package seat 18 to precisely locate the bite-wing B on the package P. In addition to the above-described flange 77 carried by casting 54 and slot 78 carried by plate 75 forming the lower valve plate and the turntable, we prefer to provide an adjustable friction device, Figs. 1, 6 and 25. This may consist of a ring 225 having spaced cams or high spots 226. The ring is placed on and moves with gear 61. A pair of brake shoes 227 is carried by arms 228 pivoted at 229 and having their opposite ends 230 pressed apart by spring 231. An adjustable bolt 232 limits outward movement. The brake shoes 227 are adjusted to just contact with high spots 226 on ring 225 keyed to gear 61 so that as shaft 62 turns 180° it may turn freely and rapidly until the high spots 226 reach brake shoes 227 which will slow up and take up lost motion in the gearing and position turntable 75 so the grooves 78 may slide directly over the flanges 77 and the parts will be precisely positioned. As the parts come to rest, but little of the high spot 226 is engaged by the brake shoes 227 and starting up again quickly releases this friction.

Also, it is preferable to have an accurate stop to limit the downward movement of shaft 62 to the table 1 and limit pressure that may be applied between the picker arms and package, see Fig. 6. Accordingly, a split threaded ring 62$^r$ is placed on a threaded upper end of the shaft and, after accurately locating, is pinched in place by a set screw as is well known. This stop ring 62$^r$ may strike and be located by a finished pad 62$^p$ lying about the felt washer 62$^w$. Thus, the exact extent of the downward movement of the shaft 62, and the parts carried thereby, is accurately determined and the pressure is limited to an amount which is not detrimental to photographic X-ray film.

From the above description, the operation of the machine is as follows. The conveyor or table 1 is intermittently moved, as by a Geneva movement, equal increments. Spaced seats 18 and 19 receive dental X-ray film packets at a loading station and reduced pressure through ports 26 holds the X-ray packets on the intermittently moving conveyor. At a second station, bite-wing blanks 50 are applied to seats 19 and are held by pins 20. When the conveyor has advanced to the bite-wing applying station, a turntable moves down. Picker members raise and fold the bite-wing blank and the turntable turns 180° and is lowered, placing the folded bite-wing B firmly on the package P. When the table 1 moves to a pressing station, a pusher rod 150 moves a packet P and the upstanding bite-wing B between belts to firmly press the bite-wings on the package. If desired, heat may be also applied.

These operations are all accomplished as the circular conveyor moves intermittently. The preferred described embodiment of our invention described above accomplishes the several objects of our invention and is well adapted to meet conditions of practical use.

As various possible embodiments may be readily made, and as various changes may be made in the embodiments above set forth, it is to be understood that all the matter herein set forth, or shown on the accompanying drawings, is to be interpreted as illustrative only, and not in a limiting sense.

Having thus described our invention, what we claim is new and desire to secure by Letters Patent of the United States is:

1. A machine for applying bite-wings to dental X-ray film packages comprising a conveyor, a series of seats to receive dental X-ray film packages supported thereby, a plurality of seats forming supports for bite-wing strips thereon, the seats for the X-ray packages and supports for the bite-wing strips being arranged in pairs spaced at equal distances on the conveyor, means for advancing the conveyor step-by-step equal to the spacing between the pairs of seats, a turntable intergeared with the conveyor to turn 180° at each movement of the conveyor, said turntable overlying the conveyor and means connected to the means for advancing the conveyor for reciprocating the turntable to and from the conveyor in timed relation thereto, side and end pairs of enclosure plates carried by the turntable, two spaced pairs of picker arms pivoted to enclosure plates carried by the turntable so positioned relative to the turntable that one pair at a time may lie over an X-ray package and the other pair may lie over a bite-wing blank carried by the conveyor, a multiple port air valve, the picker arms having air apertures at their outer ends and air ports at their upper ends, an air valve operating mechanism intergeared to the means for advancing the conveyor to operate the valve in timed relation thereto, said multiple port air valve operated by said mechanism and connected to a suction line for drawing a reduced pressure on the picker arms to pick up a bite-wing strip from the conveyor, one of said side enclosure plates having a suction port between the picker arms for drawing the bite-wing strips up between the picker arms to fold the bite-wing strips as the arms swing about their pivots toward each other, movement of the turntable moving the pair of picker arms from a position to pick up a bite-wing strip to a position to apply a bite-wing strip at each reciprocating and 180° movement of the turntable, said multiple port valve releasing suction on the bite-wing carrying picker arms when the bite-wing is applied to the dental X-ray film package.

2. The machine for applying bite-wings to dental X-ray film packages defined in claim 1 characterized in that the picker arms are geared together to move together and to the same extent.

3. The machine for applying bite-wings to dental X-ray film packages defined in claim 1 characterized in that the picker arms are geared together to move to the same extent and in that a light spring normally holds the picker arms in a spaced position of rest.

4. The machine for applying bite-wings to dental X-ray film packages as defined in claim 1 characterized in that the pairs of picker arms are hingedly mounted between two plates which form with the picker arms and a bite-wing blank held thereby, a substantially air-tight chamber whereby air evacuated through the air port connected to the valve may pull the bite-wing strip up between the picker arms as the latter swing upon their pivots toward each other.

5. The machine for applying bite-wings to dental X-ray film packages as defined in claim 1 characterized in that the pairs of picker arms are hingedly mounted between two plates which form with the picker arms and a bite-wing blank held thereby, a substantially air-tight chamber whereby air evacuated through the suction port connected to the valve may pull the bite-wing strip up between the picker arms as the latter swing upon their pivots toward each other and a light spring coacting with the picker arms tending to separate the arms, thus holding the folding bite-wing blank taut.

6. A machine for applying bite-wings to dental X-ray film packages comprising a rotary table, a plurality of pairs of seats comprising a first seat to receive dental X-ray film packages and a second seat forming supports for bite-wing strips adjacent each other, the said pairs of seats and supports being arranged at equal angles about the periphery of the rotary table, mechanism for driving the table intermittently through the said equal angles to position a dental X-ray film package and a bite-wing blank at an applying station, a turntable mounted over the table at the applying station, means operably connected with the mechanism for driving the turntable intermittently through 180°, means connected to the mechanism for driving the turntable to reciprocate it to and from the rotary table, a pair of spaced enclosure plates, two pairs of hollow picker arms pivoted to and movable between the plates to form a substantially airtight connection therewith, said picker arms including ports in the ends of the picker arms, picker arms having perforations therein, the enclosure plates having ports between the plate between the picker arms, a reduced pressure line, a multi-port valve connected to the reduced pressure line, operating means for the multi-port valve connected to the mechanism for driving the rotary table and operable in timed relation thereto, air line connections between the multiple port valve and the ports in the picker arms and the port in one of the spaced enclosure plates between the picker arms for applying a vacuum to perforations in the ends of the picker arms to hold the ends of a bite-wing strip thereto, the port in the spaced enclosure plate between the picker arms and the multiple port valve providing a means through which a reduced pressure may be applied between the picker arms to draw the center portion of the bite-wing strip between the picker arms for folding the bite-wing blank when vacuum is applied through the multiport valve, the means for operating the multiport valve in timed relation to the mechanism causing one pair of picker arms to move downwardly to pick up a bite-wing blank as the other pair of picker arms move downwardly to apply the folded bite-wing strip to the dental X-ray package each time the rotatable head moves 180° and reciprocates to and from the table.

7. The machine for applying bite-wings to dental X-ray film packages as defined in claim 6 characterized in that said multiple port valve comprises an air chamber including a first valve plate having apertures, a second valve plate having grooves and ports movable thereagainst, and a third valve plate having pneumatic tubes leading from the valve plate, and tubes leading to the picker arms from the ports of the third valve plate.

8. The machine for applying bite-wings to dental X-ray film packages as defined in claim 6 characterized in that said multiple port valve comprises an air chamber including a first valve plate having apertures therein, a second valve plate having grooves and ports movable thereagainst and a third valve plate having pneumatic tubes leading from the valve, and tubes leading to the picker arms and the third valve plate, said first valve plate being intergeared to the operating mechanism for the rotatable table to be operated in timed relation thereto.

9. The machine for applying bite-wings to dental X-ray film packages as defined in claim 6 characterized in that the mechanism for intermittently operating the conveyor and the means operably connected thereto for intermittently operating the turntable through 180° include gears connecting the conveyor moving means and the turntable moving means, the ratio of the gears moving the turntable 180° at each movement of the conveyor through the angle separating each pair of dental X-ray package seat and a bite-wing blank support seat whereby a fresh dental X-ray film package and a fresh bite-wing blank are together advanced beneath the turntable at each actuation of the rotary table.

10. A machine for applying bite-wings to dental X-ray film packages comprising a circular conveyor, a plurality of pairs of seats, one of each pair of seats for receiving the dental X-ray packages and the other of each pair of seats forming a plurality of supports for bite-wing blanks, the pairs of seats being arranged in like angular relationship about the periphery of the circular conveyor, a mechanism for moving the conveyor through an angle for presenting a fresh dental X-ray film package seat and a seat forming a support for the bite-wing blank at a bite-wing applying station, said mechanism including a Geneva gear and gearing driven thereby, said gearing including a gear to be turned 180° each time the circular conveyor is turned one step by the Geneva gear, a turntable, a shaft for carrying the turntable, means included in the mechanism moving the shaft axially to and from the table and fixedly carrying the gear to be turned 180°, a bite-wing applicator carried by the turntable, two pairs of enclosure plates carried by the turntable two pairs of picker arms hingedly mounted on the enclosure plates for picking up a bite-wing strip by its ends and constituting an applicator, suction means for holding a folded bite-wing carried by each pair of hinged picker arms carried by the enclosure plates, and suction means for folding the bite-wing strip between the picker arms, one pair of picker arms carried by said applicator picking up a bite-wing blank while the other pair of picker arms carried by the enclosure plates simultaneously deposits a folded bite-wing upon a dental X-ray film package each time the shaft moves the applicator to and from the conveyor.

11. A machine for applying adhesively-coated bite-wings to dental X-ray film packages comprising a rotary conveyor, equally spaced pairs of seats on the conveyor, each pair comprising one seat for a bite-wing blank and one seat for a film package, means for moving the conveyor step-by-step, to position a pair of seats beneath a bite-wing applying station, a turntable at the bite-wing applying station, means operable in timed relation to the conveyor for turning the turntable 180°, means for moving the turntable to and from the rotary conveyor in timed relation thereto, two pairs of picker arms having apertured ends hingedly carried by enclosure plates carried by the turntable, one pair of picker arms movable into alignment with a bite-wing blank seat and the other pair of picker arms movable into alignment with an X-ray package seat when the rotary conveyor is at rest, a rocker arm operably connected to the means for moving the rotary conveyor for moving the turntable to and from the conveyor in synchronism with movement of the conveyor, pneumatic means connected to the turntable and the picker arms having apertured ends carried thereby, a valve operably connected to the means for moving the rotary conveyor for controlling the pneumatic means for causing the apertured ends of one set of picker arms to engage and move a bite-wing blank, and the suction in the apertured enclosure plates to fold the bite-wing blanks as the turntable moves to and from the conveyor, said valve controlling the pneumatic means to the other set of picker arms causing the apertured ends of said picker arms to release the folded bite-wing and press it upon the X-ray film package to adhesively secure it thereto as the turntable moves downwardly against the rotary conveyor, and a pressing device, mechanism operably connected to the means for moving the rotary conveyor for moving an X-ray film package with its adhesively-secured bite-wing into the pressing device, a second conveyor for moving the package and attached bite-wing through the pressing device to insure firm contact between the bite-wing and dental X-ray film package.

12. In a machine for applying bite-wings to dental X-ray film packages, a circular conveyor, a power drive, Geneva gear means for driving the conveyor in a step-by-step movement connected to the power drive, pairs of seats carried by the conveyor and spaced equidistant on the conveyor, one of each pair of seats for locating an X-ray package thereon, pneumatic means for holding an X-ray package in its seat extending only partially around the conveyor, the other of each pair of seats forming a support for bite-wing blanks, pins in said seats for engaging bite-wing blanks, a turntable mounted above the table, gearing for moving the turntable 180° in timed relation to the movement of the circular conveyor and from the power drive, pairs of enclosure plates carried by the turntable, separate pairs of picker arms carried by the enclosure plates movable with the turntable from a position above one seat to a position above the other seat, the picker arms having perforated ends, a reduced pressure line, and a valve mechanism connected to the picker arms for causing the perforated ends of the picker arms to engage and release bite-wings engaging one held in its seat by pins, said valve mechanism and reduced pressure line controlling the releasing of a folded bite-wing as it is applied to an X-ray film package, mechanism for raising and lowering the turntable connected to the power drive and operable in timed relation to movement of the circular conveyor to contact the picker members with a bite-wing and for applying a bite-wing to an X-ray package, and pneumatic means operable on a bite-wing for folding the bite-wing as the turntable is moved.

13. The machine for applying bite-wings to dental X-ray film packages defined in claim 12 characterized in that a presser mechanism, including a pusher member operably connected to the source of power may move a dental X-ray film from its seat when said package has been moved by the circular conveyor past the pneumatic means for holding the dental X-ray film package in its seat.

14. In a machine for applying bite-wings to dental X-ray film packs, a power drive, a circular conveyor, a Geneva gear for operating the conveyor through like angles and intermittently from the power drive, a series of pairs of seats arranged at like angles about the periphery of the conveyor, each pair comprising one seat to receive a dental X-ray film packet and the other to receive a bite-wing blank, a turntable mounted to turn about a shaft centered between a pair of seats when the conveyor is stationary, gearing between the power drive and shaft for operating the turntable in timed relation to the circular conveyor to move 180° at each actuation, enclosure plates carried by the turntable, two pairs of picker arms movably carried by the enclosure plates, one pair centered above the X-ray packet seat and the other pair centered above the bite-wing seat, each picker arm including perforated ends, a reduced pressure line, means for connecting and disconnecting the picker arms to and from the reduced pressure line, a valve controlling said means, the enclosure plates having an air vent between the picker arms connected to the reduced pressure line, said valve controlling the flow of air therethrough, gearing between the turntable and circular conveyor operable in timed relation with the circular conveyor for moving the turntable to and from the circular conveyor enabling the perforated ends of one set of picker arms to engage the ends of a bite-wing as the perforated end of the other set of picker arms engages the ends of a folded bite-wing drawn between the picker arms by air passing through the enclosure plate vents between the picker arms with an X-ray package, said pneumatic valve operating the picker arms in one direction in timed relation to the movements of the circular conveyor, and a spring means tending to move the picker arms from each other.

15. In a machine for applying bite-wings to dental X-ray film packs, a power drive, a circular conveyor, a Geneva gear for operating the conveyor through like angles and intermittently from the power drive, a series of pairs of seats arranged at the like angles about the periphery of the conveyor, each pair comprising one seat to receive a dental X-ray film packet and the other to receive a bite-wing blank, a turntable mounted to turn about a shaft centered between a pair of seats when the conveyor is stationary, gearing between the shaft and the conveyor for operating the turntable in timed relation to the circular conveyor to move 180° at each actuation, apertured enclosure plates carried by the turntable, pairs of picker arms having perforated ends hingedly attached to the enclosure plates, one pair of picker arms being centered above the X-ray package seat and the other pair of picker arms being centered above the bite-wing seat, gearing operable in timed relation with the turntable for moving the turntable to and from the circular conveyor enabling the perforated ends of one set of picker arms to engage the ends of a bite-wing blank as the perforated ends of the other set of picker arms engage a folded bite-wing with an X-ray package, a reduced pressure line, a control valve connected thereto and connected to the picker arms and to the apertures in the enclosure plates for providing reduced pressure in the picker arms and between the picker arms by the apertures in the enclosure plates in timed relation, for moving the bite-wing blank from its seat, and for folding the bite-wing blank as it is raised by the turntable whereby the folded bite-wing blank may be moved into engagement with a dental X-ray film packet in its seat, while held by reduced pressure through the perforated ends of the picker arms, and spring means tending to move the pairs of picker arms to a separated position when the reduced pressure to the apertured ends of the picker arms is cut off, each pair of picker arms including intermeshing gear teeth for moving the picker arms together.

References Cited in the file of this patent

UNITED STATES PATENTS

| Number | Name | Date |
| --- | --- | --- |
| 1,440,856 | Westcott | Jan. 2, 1923 |
| 1,828,347 | Straus | Oct. 20, 1931 |
| 2,031,053 | Massini | Feb. 18, 1936 |
| 2,302,561 | Libby | Nov. 17, 1942 |
| 2,351,200 | George | June 13, 1944 |